United States Patent
Swann (10) Patent No.: US 9,440,746 B2
(45) Date of Patent: Sep. 13, 2016

(54) AIRCRAFT VAPOUR TRAIL CONTROL SYSTEM

(71) Applicant: ROLLS-ROYCE PLC, London (GB)

(72) Inventor: Peter Swann, Nottingham (GB)

(73) Assignee: ROLLS-ROYCE plc, London (GB)

( * ) Notice: Subject to any disclaimer, the term of this patent is extended or adjusted under 35 U.S.C. 154(b) by 57 days.

(21) Appl. No.: 14/644,874

(22) Filed: Mar. 11, 2015

(65) Prior Publication Data

US 2015/0284101 A1 Oct. 8, 2015

(30) Foreign Application Priority Data

Apr. 2, 2014 (GB) .................................. 1405896.0

(51) Int. Cl.
| | | |
|---|---|---|
| *B64D 45/00* | (2006.01) | |
| *B64D 31/06* | (2006.01) | |
| *G05B 17/02* | (2006.01) | |

(52) U.S. Cl.
CPC .............. *B64D 31/06* (2013.01); *B64D 45/00* (2013.01); *G05B 17/02* (2013.01); *B64D 2045/009* (2013.01); *B64D 2045/0085* (2013.01)

(58) Field of Classification Search
None
See application file for complete search history.

(56) References Cited

U.S. PATENT DOCUMENTS

| 9,146,566 B2* | 9/2015 | Swann | F02C 3/30 |
| 9,309,811 B2* | 4/2016 | Swann | F02C 9/28 |
| 2008/0275597 A1 | 11/2008 | Gaulmin et al. | |
| 2013/0340324 A1* | 12/2013 | Swann | F02C 3/30 44/307 |
| 2013/0343958 A1* | 12/2013 | Swann | F02C 3/30 422/111 |
| 2015/0100219 A1* | 4/2015 | Swann | F02C 9/28 701/100 |
| 2015/0134151 A1* | 5/2015 | Swann | F02C 3/20 701/3 |
| 2015/0284102 A1* | 10/2015 | Swann | B64D 33/04 701/3 |
| 2015/0284103 A1* | 10/2015 | Swann | B64D 31/10 701/3 |
| 2015/0285158 A1* | 10/2015 | Hillel | B64D 31/06 60/772 |
| 2016/0146117 A1* | 5/2016 | Swann | B64D 37/04 701/100 |

FOREIGN PATENT DOCUMENTS

| EP | 286037 A1 | 10/1988 |
| EP | 2 685 280 A2 | 1/2014 |

(Continued)

OTHER PUBLICATIONS

Haglind, "Potential of lowering the contrail formation of aircraft exhausts by engine re-design", Aerospace Science and Technology, 2008, pp. 490-497, vol. 12.

Oct. 24, 2014 Search Report issued in Brtitish Patent Application No. GB1405896.0.

(Continued)

*Primary Examiner* — Redhwan K Mawari
*Assistant Examiner* — Edward Torchinsky
(74) *Attorney, Agent, or Firm* — Oliff PLC (57) ABSTRACT

An aircraft propulsion control system for an aircraft having a plurality of combustion engines is provided. The system has a plurality of sensors for sensing a condition indicative of properties and/or formation of vapor trails which may be formed by the plurality of engines. A controller is arranged to control one or more operational variable for each of the plurality of engines. The controller is arranged to undertake a search of trial values of the operational variable by instructing different concurrent values of said operational variable across the plurality of engines and determining the resulting impact on the vapor trail formation and/or properties as sensed by the sensors. A population-based search may be performed, for example in parallel over all the engines at once so as to reduce the time taken to achieve vapor trail mitigation.

22 Claims, 7 Drawing Sheets

(56) References Cited

FOREIGN PATENT DOCUMENTS

| | | | |
|---|---|---|---|
| EP | 2860374 A1 | 4/2015 | |
| GB | 2095755 A | 10/1982 | |

OTHER PUBLICATIONS

Jun. 3, 2016 Office Action issued in British Patent Application No. GB1405896.0.

* cited by examiner

AIRCRAFT VAPOUR TRAIL CONTROL SYSTEM

BACKGROUND OF THE INVENTION

The present invention relates to aircraft propulsion systems, and more particularly to control systems for aiding the prevention of the formation of contrails and/or for influencing the properties of contrails.

The term "contrail mitigation" is used herein to encompass the suppression of contrail formation and/or the alteration of contrail properties, for example to reduce the climate warming impact of contrails.

Contrails, also known as condensation trails or vapour trails, are line-shaped ice-clouds that appear behind aircraft under certain circumstances. The formation of a contrail depends on a number of factors, including: ambient temperature, humidity and pressure; the efficiency of the aircraft's engines; and the properties of the fuel burned in the engines.

A contrail, once formed, will typically dissipate within a minute or so, unless the ambient air is supersaturated with respect to ice, in which case the contrail may persist. A persistent contrail may grow over time to resemble natural cirrus cloud, both in size and optical properties, and is then referred to as "contrail-cirrus". Line-shaped contrails and contrail-cirrus are collectively referred to as "aviation-induced cloudiness" (AIC). Contrail-cirrus is thought to cause a majority of the climate impact of AIC due to it being spatially-larger and longer-lived than non-persistent line-shaped contrails.

It has been found that contrail properties may be affected by the properties of the fuel that is burned in the engine of an aircraft. Kerosene and other hydrocarbon fuels typically contain a wide variety of types of molecule, characterised by their sizes (number of carbon atoms) and shapes. Some common molecule shapes include: chain-shaped molecules (paraffins), chains with branches (iso-paraffins), and chains wrapped into rings (cyclo-paraffins). Also common within many hydrocarbon fuels is the family of molecules known as "aromatics", which are also ring-shaped but possess different properties from the cyclo-paraffins.

European Patent Applications 13168164.5 (published as EP2685280) and 13168163.7 (published as EP2677139), both owned by Rolls-Royce plc, disclose systems for altering contrail properties by mixing a plurality of fuel sources together in different proportions so as to vary the final fuel composition supplied to the engines. However it has been found that the delay, between instructing a final fuel composition and observing the resultant change in contrail properties, reduces the responsiveness of the iterative system to changing conditions.

Depending on the metric employed, the climate-warming impact of aviation-induced cloudiness may be of a similar magnitude to that of the CO2 emitted by aircraft, and may therefore represent a significant element of aviation's total climate impact. Contrail mitigation, and particularly the mitigation of persistent contrails, therefore represents a compelling opportunity for a significant reduction in the overall climate warming impact of aviation. However any additional operational penalties incurred in order to achieve contrail mitigation require careful scrutiny to determine whether the penalties outweigh the possible contrail mitigation benefits.

The time taken to determine and implement an appropriate level of actuation of a contrail mitigation scheme or mechanism can be significant to the effectiveness of any measures undertaken. For example an aircraft at cruise can cause contrail formation at a rate of typically 10 miles (16 km) per minute and so an effective contrail mitigation system must be able to implement an acceptable solution rapidly, in order to minimise the aircraft's contrail-related climate-change impact in a cost-effective manner.

It is therefore an object of the present invention to manage the mitigation of contrails in a manner that reduces negative impact on climate, for example while minimising the operational penalty incurred in doing so. It may be considered an additional or alternative aim to provide a system for aircraft engine contrail mitigation which can react quickly and/or effectively to changes in contrail-inducing conditions.

BRIEF SUMMARY OF THE INVENTION

According to a first aspect of the invention there is provided an aircraft propulsion control system for an aircraft comprising a plurality of combustion engines, the system comprising: one or more sensor for sensing a condition indicative of actual or implied vapour trail formation by the plurality of engines; and a controller arranged to control one or more operational variable for each of the plurality of engines, wherein the controller is arranged to undertake a search of trial values of said operational variable by instructing different concurrent values of said operational variable for the plurality of engines and determining the resulting impact on the vapour trail formation by the one or more sensor.

The controller may be arranged to control a plurality of operational variables for each engine, wherein the controller is arranged to undertake a search of trial values of each of said operational variables, e.g. concurrently.

The invention is beneficial where a relatively wide range of operational variable values is to be investigated in order to determine a suitable or optimal setting. The invention is particularly beneficial where suitable or optimal settings are to be determined for a plurality of operational variables and/or are influenced by a plurality of operational or environmental conditions (e.g. when a condition is outside the control of the control system for the purpose of vapour trail mitigation). Thus the vapour trail control system of the present invention may be part of a wider aircraft propulsion control system, wherein a number of operational conditions are outside the control of the vapour trail control system and only a predetermined number of operational variables are controllable for the purpose of vapour trail mitigation.

One or more engine may be controlled to operate at a current or previously-determined optimal value of the operational variable whilst one or more trial value of the operational variable is attempted for one or more further engine by the controller. Alternatively trial values of the operational variable may be attempted on a plurality or all engines on the aircraft concurrently. A plurality of operational variables may be explored on the, or each, engine.

The search by the controller may comprise sweeping through a range of values of the operational variable. The controller may or may not instruct a first portion of the range to be implemented by a first engine and a second portion of the range to be implemented by a second engine, e.g. concurrently. The controller may identify a plurality of trial values of the operational variable to be attempted over said range. The range may be a predetermined range or else a range calculated by the controller, for example according to a (current) operating condition of the engine(s).

The controller may select a trial value of the operational variable based upon the output of one or more sensor, for example based upon an impact on vapour trail formation.

If a positive impact of a trial value on vapour trail formation (e.g. elimination of vapour trail formation), or on vapour trail properties (e.g. an advantageous change in vapour trail optical depth) is determined for one engine, that trial value of the operational variable may be implemented for a plurality or all engines. Additionally or alternatively, a local search for an optimal value of the operational variable for each engine may be performed within a predetermined range of the trial value.

The search may be performed by the controller in a plurality of phases. The phases may or may not be conducted sequentially. A first phase may or may not comprise a distributed search performed by the controller across a plurality, or all, of the engines. A first phase may establish an initial or coarse trial value or sub-range for the operational variable for a plurality of the engines. The first phase may be a default search, e.g. irrespective of sensor feedback. Additionally or alternatively the first phase may comprise a population-based optimisation routine.

A second phase of the search may or may not be conducted individually for each of the engines, for example to establish an optimal value of the operational variable for each individual engine. The second phase may comprise a fine search phase and may be conducted within a predetermined range of the selected operational variable value (e.g. a sub-range of the operational variable) output by the first stage. The second search may comprise an optimisation routine.

The use of different search phases allows an initial optimal operational variable range to be determined for all engines, followed by selection of a local optimal value for each engine within said range. Thus different optimal values of the operational variable may be implemented for each engine by the controller as a result of the second search phase. This is particularly beneficial for achieving an acceptable level of vapour trail mitigation quickly, whilst also allowing optimisation for each engine.

In one example a first search phase may satisfy one or more primary operational requirement. A second search phase may satisfy one or more secondary operational requirement, e.g. bounded by, or without compromise to, the outcome of the first search phase.

The controller may determine or apply a confidence value to a selected trial value of the operational variable. The confidence value may comprise a stochastic or probabilistic value, for example based upon one or more operational variable or condition for the particular engine on which the selected trial value was instructed. The confidence value may influence a decision by the controller to implement the selected trial value of the operational variable for one or more further engine and/or may be used to determine a permitted range of variation associated with the selected value of the operational variable. The controller may determine a range for a secondary search phase based upon the confidence value. The confidence value may be determined from a performance degradation plot for the particular engine on which the selected trial value was instructed.

The search by the controller may be initiated by a change, e.g. a material change, in one or more sensor reading. The controller may instigate the search on a condition that the change in sensor reading meets or exceeds a predetermined duration and/or a predetermined magnitude. The search by the controller may be initiated by a sensor reading from one or more sensor indicative of actual or implied vapour trail formation, for example when the sensed vapour trail characteristic, e.g. such as vapour trail optical depth, meets or exceeds a predetermined threshold value, which may be a zero value. Additionally or alternatively, the search by the controller may be initiated at predetermined time intervals.

One or more sensor may be provided for detecting actual or implied vapour trail formation. The one or more sensor may comprise the same or different types of sensors. At least one sensor may be provided for each engine, for example, so as to output a reading for a corresponding engine. Alternatively, a single sensor, such as a video camera, may enable sensing of vapour trail formation from one or more than one or each engine concurrently.

The one or more sensor may comprise a vapour trail detection sensor, for example for outputting a signal indicative of a characteristic of a vapour trail. The sensor may detect the presence or absence of a vapour trail downstream of each engine. At least one vapour trail detection sensor may be provided for each engine. The, or each, vapour trail detection sensor may comprise an optical depth sensor.

Additionally or alternatively, the system may comprise one or more ambient condition sensor and/or one or more engine operation sensor. The ambient condition sensor(s) may comprise any or any combination of a temperature, pressure, humidity and/or light sensor, e.g. for local atmospheric conditions in the vicinity of the aircraft or one or more engines. The ambient condition sensor(s) may comprise a sensor or sensors for determining the strength and/or direction of sunlight incident upon vapour trails formed by one or more of the plurality of engines.

The operational variable may comprise a fuel composition delivered to the engine(s). The control system may comprise a regulator configured to regulate a percentage of a first and a second fuel composition delivered to one or more of the engines as resultant fuel composition. A regulator may be provided for each of the plurality of engines. The controller may search trial fuel compositions by controlling one or more regulator to deliver to one or more engine a plurality of trial fuel compositions having different ratios of the first and second fuel compositions.

The fuel composition regulator may comprise a fuel mixer or blender. The fuel composition regulator may comprise a plurality of valves, e.g. one for each fuel source.

The system may comprise a plurality of fuel tanks (a tank being a single tank or alternatively a network of fluidly interconnected tanks), each tank being fluidly isolated from the other tank(s). A first fuel tank may comprise the first fuel composition and a second fuel tank may comprise the second fuel composition. One or more further fuel tank, comprising one or more further respective fuel composition, may be provided.

The controller typically comprises machine readable instructions, such as one or more module of code and/or control algorithm, for control of the operational variable with the aim of suppressing contrail formation from the engine and/or influencing the properties of a vapour trail formed by the engine.

The engine is typically a propulsion engine such as a gas turbine engine, e.g. an axial flow engine.

According to a second aspect of the invention, there is provided a data carrier comprising machine readable instructions for operation of a controller of an engine control system in accordance with the first aspect. The data carrier may comprise a persistent memory or data carrier device.

According to a third aspect of the invention, there is provided a method of controlling a plurality of aircraft engines in accordance with the control system of the first aspect.

Any of the preferable features defined above in relation to the first aspect may be applied to the second or third aspect.

BRIEF DESCRIPTION OF THE DRAWINGS

Practicable embodiments of the invention are described in further detail below by way of example only with reference to the accompanying drawings, of which.

DETAILED DESCRIPTION OF THE INVENTION

The present invention concerns the use of a distributed search process to determine and implement optimal or desirable contrail mitigation settings across a plurality of aircraft engines. The term 'operational variable' is used to herein to refer to an engine-specific control variable that is under the control of the contrail mitigation system and for which a desired setting is to be determined and implemented by the invention.

Figure 1:
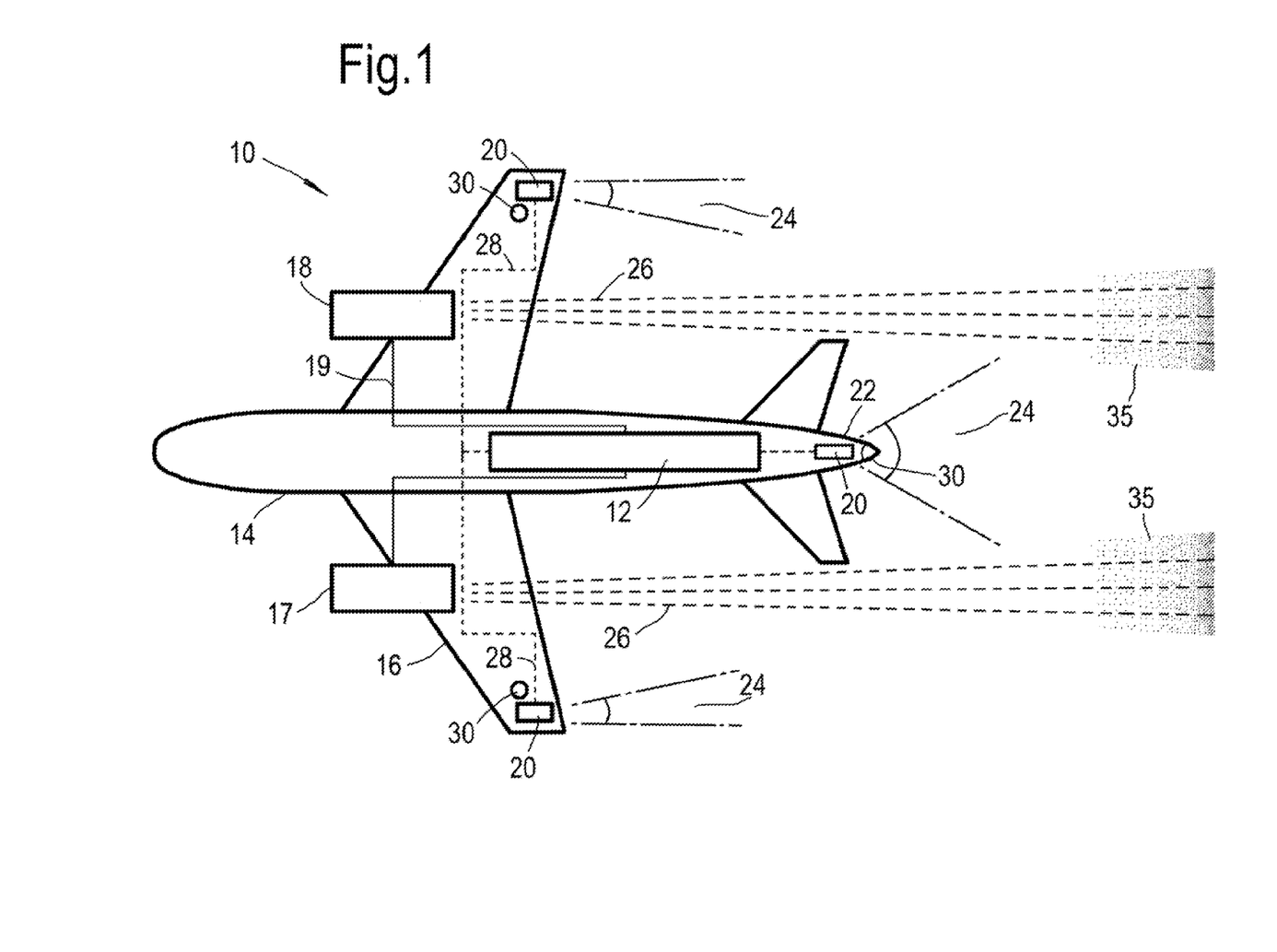
FIG. 1 shows an aircraft comprising a propulsion control system according to an example of the invention.

Turning firstly to FIG. 1, there is shown an aircraft 10, which comprises an example of an engine control system according to the present disclosure. In the example shown the aircraft comprises a fuselage 14 from which wings 16 extend, with engines 17, 18 mounted to the wings. Other examples might involve alternative aircraft configurations, and different numbers of engines. The control system of this example controls delivery of fuel to the engines and accordingly comprises a fuel system 12, which in this example is located in the fuselage 14. In alternative examples the fuel system 12 may be located elsewhere in the aircraft 10. Fuel pipes 19 fluidly connect the fuel system 12 and engines 17, 18.

The control system comprises at least one vapour trail detection sensor 20. In the example shown in FIG. 1, vapour trail detection sensors 20 are mounted towards the rear of the aircraft 10 facing aft. For example they are located at or near the tip of one or both wings 16 and/or at or near a trailing edge 22 of the fuselage. The, or each, vapour trail detection sensor 20 is mounted such that it has a field of view 24 directed towards a vapour trail formation region. That is to say they are positioned such that they have a field of view 24 in a direction downstream of the aircraft 10, which in operation will offer a view of vapour trails 35 formed within the exhaust plumes 26 of the engines 17, 18. The, or each, vapour trail detection sensor 20 is configured to generate a first signal 28 (shown as a dotted line) which indicates, for example, an optical depth (OD) of the young vapour trail 35.

The, or each, vapour trail detection sensor 20 is an optical device configured to deliver a signal indicative of the presence and/or properties of a vapour trail 35. A source of illumination 30 may also be provided on the aircraft and directed towards at least one region downstream of the engines 17, 18 to illuminate at least part of the field of view 24 of the sensor 20. The sensor 20 is configured to detect electromagnetic radiation of at least one wavelength emitted and/or reflected by the vapour trail in response to energy emitted from the source of illumination 30. In other embodiments, instead of illumination, an emitter of sound (or ultrasonic) waves could be provided. The sensor 20 would then be configured to detect the sound returned from the ice particles in the young contrail.

In an alternative embodiment, the function of the vapour trail detection sensor could be performed by equipment remote to the aircraft, and the resulting information transmitted to the aircraft. Such equipment might include for example sensors mounted on the ground, on airships or balloons, on other aircraft, and/or on earth-orbiting satellites. In such situations, the operation of the non-aircraft mounted vapour-trail detection sensors may optionally be enhanced by use of the aircraft-mounted source of illumination 30.

Figure 2:
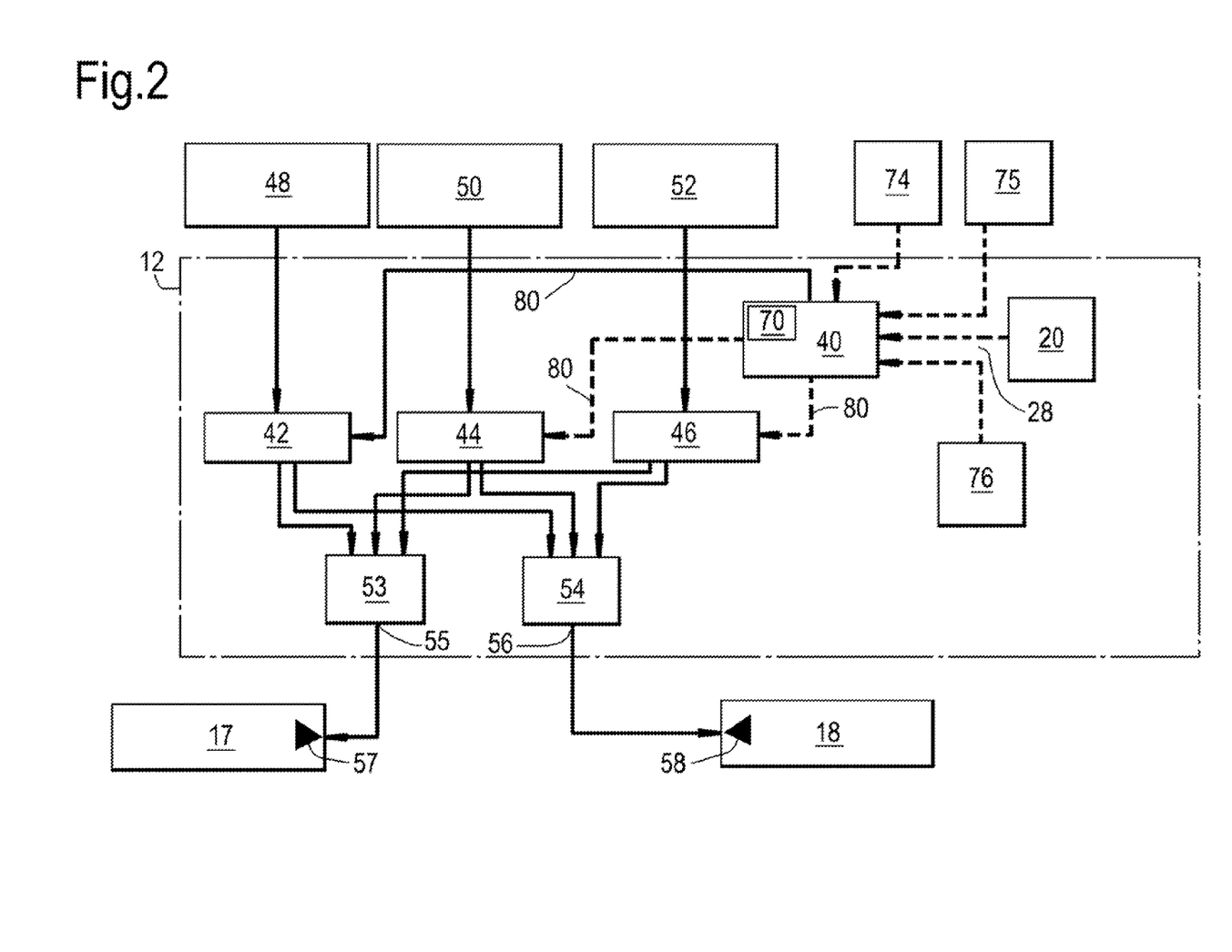
FIG. 2 is a diagrammatic representation of an engine fuel delivery system according to an example of the invention.

FIG. 2 shows a diagrammatic representation of the fuel system 12. For the avoidance of doubt, and as also shown in FIG. 1, the arrows with solid lines indicate the fuel flow communication path, and the arrows with dashed lines indicate signal communication routes.

The fuel system 12 has a control unit 40 which is in signal communication with the, or each, vapour trail detection sensor(s) 20. In FIG. 2 only one vapour trail detection sensor 20 is shown. In alternative examples there would typically be more than one sensor 20, including at least one sensor per engine, although a single sensor 20 could associate individual contrails in its field of view with different engines.

The control unit 40 is also in signal communication with at least a first fuel composition regulator 42 and a second fuel composition regulator 44. In FIG. 2 a third fuel composition regulator 46 is shown. The number of fuel composition regulators is dependent upon the number of engines and/or fuel compositions on the aircraft. Typically at least one regulator is provided per engine and/or fuel source. Each fuel composition regulator 42,44,46 is in fluid communication with a source 48, 50, 52 of its respective fuel composition. The source of the first fuel composition is a first tank 48 for storage of a first fuel composition, and the source of the second fuel composition is a second tank 50 for storage of a second fuel composition. In the example shown the source of the third fuel composition is a third tank 52 for storage of a third fuel composition. Further tanks are a source of the fuel composition that they are provided to contain. The tanks 48,50,52 are located on board the aircraft 10. The tanks 48, 50, 52 etc are fluidly isolated from one another. That is to say, the tanks 48, 50, 52 are not in fluid communication with each other, and there is no flow of fluid between them. The word "tank" is intended to mean an individual tank or a network of fluidly interconnected tanks, where each tank/network is fluidly isolated from the other respective tanks/networks.

The fuel system 12 further comprises a plurality of fluid blenders 53, 54 in fluid communication with the source 48, 50, 52 of the first, second and third fuel composition via the regulators 42,44,46. The blenders 53, 54 are configured to mix the first, second and third fuel compositions to produce a resultant fuel composition for each engine 17, 18 respectively. The regulators 42, 44, 46 thus each have a number of outlets to deliver the required flow rate to each respective blender. Each regulator may thus comprise an array of valves, typically variable flow/regulation valves, one for each engine or blender. In other examples individual regulators may be provided for each combination of blender, or engine, and fuel source.

The fluid blender 53 has an outlet 55 for delivering the resultant fuel composition to a fuel injection device 57 in the engine 17. The fluid blender 54 has an outlet 56 for delivering the resultant fuel composition to a fuel injection device 58 in the engine 18. Thus each blender is arranged to allow a dedicated fuel blend to be supplied to each engine.

The fuel injection device 57, 58 may be any type of fuel injector, for example a fuel nozzle, airspray injector, or plain orifice. The fuel injection device 58 may comprise one fuel injector, or a plurality of fuel injectors. Although in FIG. 2 only one fuel injector 57, 58 is shown, each engine 17, 18 may be fitted with a number of fuel injectors, each in fluid communication with the relevant fuel blender 53, 54.

As shown diagrammatically in FIG. 2, the control unit 40 comprises a blending ratio calculator 70 configured to calculate the required resultant fuel composition for each engine. The blending ratio calculator may comprise one or more processors arranged to receive a plurality of inputs and to determine a suitable control output for controlling operation of the regulators 42,44,46 shown in FIG. 2 (and possibly the blenders 53, 54). It will be appreciated that the control unit 40 may comprise one or a plurality of communicating controllers/processors but will herein be referred to in the singular merely for simplicity. The controller/processor may comprise a central controller/processor located on the airframe or one or a plurality of engine-mounted controllers/processors, which may be used for other conventional aspects of engine control.

The control unit 40 is in signal communication with the vapour trail detection sensor(s) 20. It is also in signal communication with one or more ambient temperature sensor 74. In some examples, the control unit 40 may be in signal communication with additional or alternative ambient condition sensors 75 for detecting (e.g. measuring) any of ambient pressure, ambient humidity and/or instantaneous actual values of soot emission index generated by the engine(s) 17, 18. The control unit 40 is also optionally in signal communication with an array of sensors 76 or monitors for determining engine operating point. The engine operating point is defined by a collection of parameters, which may include the ambient conditions in which the engine is operating, comprising one or more engine operation parameter sensor, such as for example one or more sensor for measuring parameters such as fuel-flow rate, operating temperatures and/or pressures of the gas-flow or components at one or more locations on the engine, thrust produced by the engine, engine shaft rotational speed(s) and/or other parameters or settings indicative of the state of the engine.

Numeral 80 indicates signals representative of the relative proportions of the different available fuels that should be present in the fuel composition to be supplied to the engines. It is to be understood that there is one such signal for each of the plurality of engines. The control signal(s) 80 may define blending ratio(s) or fuel-flow rate(s) for each of the distinct fluid compositions 48, 50, 52, for each of the engines 17, 18.

The example of FIGS. 1 and 2 described above provides just one type of system that can achieve contrail mitigation. This example relies on fuel blending to vary the resultant fuel composition delivered to the engine, for example by varying the aromatic content of the resultant fuel to reduce the optical depth of a formed contrail. However there are a number of other methods of performing contrail mitigation that could be used in conjunction with the present invention instead of, or in addition to the fuel mixing system described above. For example US2010132330 describes a method of suppression of vapour trail formation through the use of directed electromagnetic energy and US2010043443 discloses use of ultrasound directed into the engine exhaust plume.

There are also a number of methods for modification or suppression of vapour trails through the use of chemicals (U.S. Pat. No. 5,005,355A, U.S. Pat. No. 4,766,725A, U.S. Pat. No. 3,517,505A, U.S. Pat. No. 3,517,512A, US2009013591A) injected either into the engine (whether with the fuel or separately from the fuel) or into the exhaust plume.

Aside from adding dedicated systems and assemblies to an engine to suppress contrails, there also exists the possibility of controlling a conventional aircraft engine in a manner that promotes contrail reduction. Typically a reduction in contrail formation can be achieved by adjusting conventional engine settings in a manner that reduces engine efficiency. This can be achieved for example by varying the angle of adjustable guide vanes or blades within an inlet or fan/compressor portion of the engine. An example of such a system is provided in the paper "*Potential of lowering the contrail formation of aircraft exhausts by engine re-design*", Fredrik Haglind, Aerospace Science and Technology, Volume 12, Issue 6, September 2008.

Any or any combination of the above-described contrail mitigation mechanisms or methodologies may be controlled by a control system according to the present invention. All of the above described methods share in common that deployment of the relevant contrail mitigation technique will incur a penalty in terms of engine operation and/or negative climate impact. Thus it is desirable to use a contrail mitigation technique selectively or in a controlled manner in order to ensure optimal benefit is achieved. In order to determine how best to employ a contrail mitigation mechanism, it is proposed that the controller 40 and sensor inputs 20, 74, 75 and 76 described above will in general be common to any control system for contrail mitigation, regardless of the actual contrail mitigation mechanism used. However it is possible that other kinds of aircraft, engine and/or ambient condition sensors could be used.

The operation of a control system for a generic contrail mitigation system in accordance with examples of the invention is described in further detail below with reference to FIGS. 3 to 8.

Figure 3:
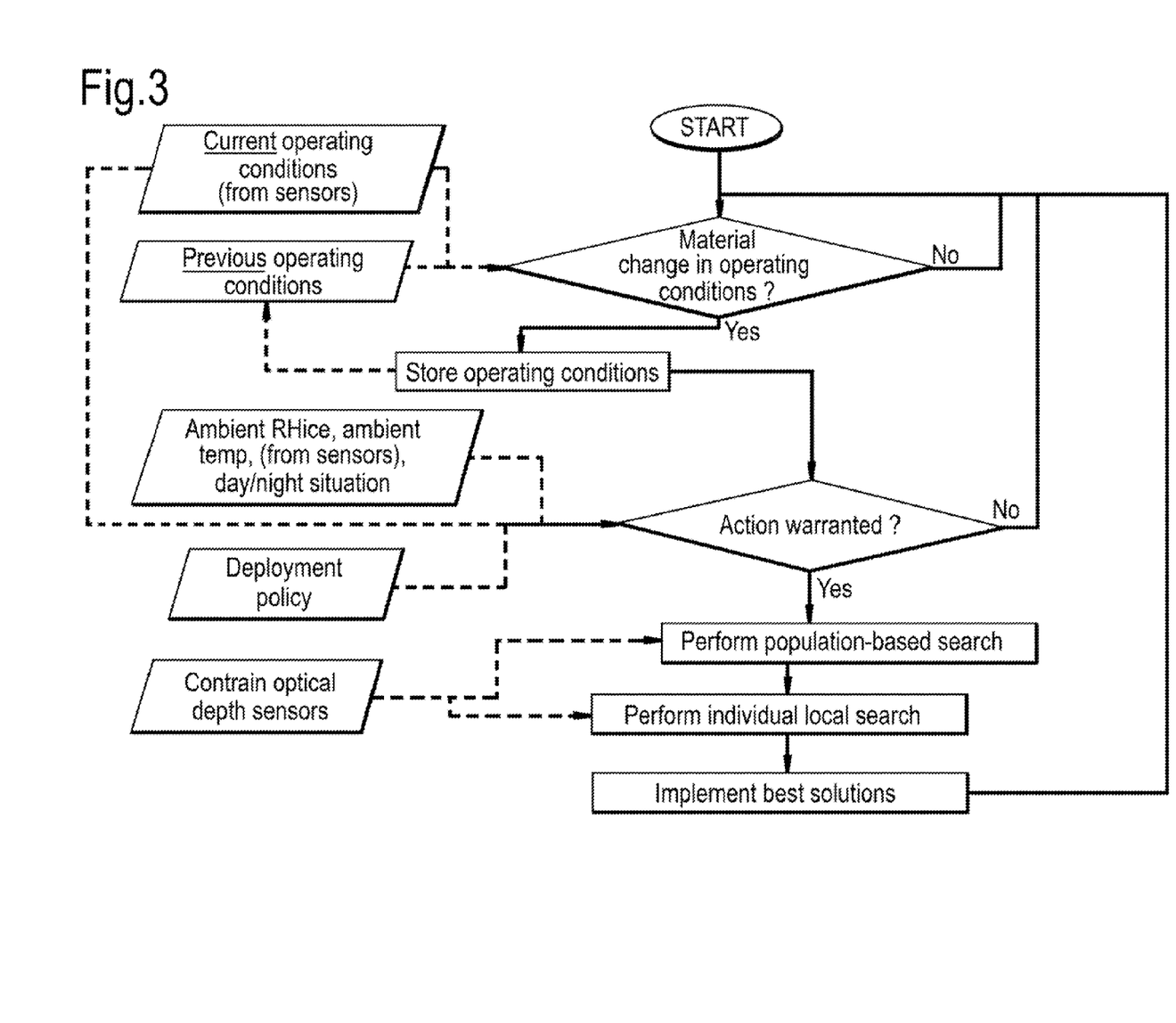
FIG. 3 is a flow chart showing the operation of a system according to an example of the invention.

In FIG. 3 there is shown a high level decision-making process for determining whether control steps are required to mitigate against contrail formation. The control system operates a primary loop to check whether the operating conditions (i.e. the ambient conditions and/or engine operation parameters) have changed materially since a previous iteration. The primary loop may execute on a continuous basis. Alternatively the primary loop may be invoked after a predetermined delay following the previous execution of the primary loop.

The operating conditions could comprise any, or any combination of, ambient temperature, ambient pressure, ambient humidity, altitude, and/or engine throttle setting or engine operating point. Any material change, initiating a search by the controller, may comprise change of any one or more parameter to an extent that will materially alter the contrail optical depth (or persistence, or occurrence of contrails).

This primary loop can be iterated without changing existing settings until a relevant change to operating conditions is determined. Current operating conditions could be stored at each iteration such that the next iteration can compare current operating conditions against one or more recorded set of previous operating conditions. Alternatively, current operating conditions are stored during the first iteration of the primary loop and thereafter only when a material change to the operating conditions is detected relative to the previously stored value. In any example, a log of previous operating conditions is maintained to allow comparison with current or most recently sensed conditions.

The controller then determines whether the vapour trail detection sensor 20 (e.g. contrail optical depth (OD) sensor) is working correctly and is able to provide a signal indicative of the OD of any contrail which may form. If so, a usage/deployment policy may optionally be employed to determine whether it is deemed appropriate to use a method for contrail mitigation under the current operating conditions. For instance, it may or may not be considered appropriate to only use this invention when contrails persist, e.g. if ambient relative humidity over ice is 100% or greater. Additionally or alternatively, it may be deemed inappropriate to use the invention if engine operating conditions or external requirements prioritise thrust or another engine parameter to the extent that there is no available scope to apply contrail mitigation. Additionally or alternatively, the decision to use or not to use this invention to modify contrail properties may be informed by other factors such as the ambient temperature and/or the strength of incoming sunlight incident upon the formed contrail. For example, it may be deemed appropriate to attempt to ameliorate only contrails which are both persistent and existing primarily during the night-time. Such additional decision criteria would avoid the need to suppress contrails that do not bear a significant climate-warming impact. Accordingly an ambient condition sensor could comprise a light sensor.

An assessment is undertaken of whether or not a contrail is forming, or would form in the absence of mitigating action, for example by comparing the measurement of vapour trail detection sensor 20 (e.g. contrail optical depth) against a pre-determined threshold value which may be a zero threshold value or a non-zero threshold value. The duration for which the threshold is exceeded may be taken into account and the contrail mitigation control scheme delayed accordingly.

If there has been no material change in the operating conditions, or a material change in the operating conditions is detected but any of the other conditions described above are not satisfied, then no change to the current contrail mitigation control settings are made. If all conditions are satisfied then a control scheme according to the invention, typically involving a search strategy across the plurality of engines, is invoked to determine and implement the optimal contrail mitigation settings for each individual engine for the prevailing conditions. A search strategy is proposed due to the complexity of calculation of truly optimal contrail mitigation settings for each of the engines. Instead it is proposed to generate an initial trial range of contrail mitigation settings to be explored and to implement a search of that range across a plurality of engines on the aircraft. The use of a feedback loop from the one or more contrail detection sensor allows the controller to establish the best settings or sub-range of settings from the initial trial range to be implemented across all the engines. This strategy can result in effective contrail mitigation being implemented in a relatively quick timeframe and avoids the need to collect significant amounts of data or make assumptions about aspects of engine behaviour in order to calculate contrail mitigation settings on a theoretical basis that could lead to an ineffective or inefficient system.

In the examples defined below, a 'cost' parameter or associated function is used for assessment of a contrail mitigation mechanism. It is important to note that such a 'cost' need not link to financial cost but may instead be used as an operational cost or penalty for use of the contrail mitigation mechanism. Such an operational cost parameter could include consideration of, for example, any or any combination of increased fuel consumption, the cost of higher-priced fuel compositions, reduction in engine efficiency, negative environmental impact arising from for example increased fuel consumption, increased flight duration (reduced aircraft speed), or other operational factors. Financial cost could also be one factor in assessing operational cost but it is not intended that the cost parameter referred to herein is so limited. The cost function may be the same or different for each engine on an aircraft. The cost function is typically specific to the current operating conditions, where "operating conditions" includes the ambient conditions (temperature, pressure, humidity) and the engine operating point (total-efficiency, throttle-setting, exhaust temperature etc).

The control system of the present invention aims to increase the speed with which an acceptable contrail-suppression or contrail-modification solution is discovered and implemented, whilst minimising the environmental impact incurred during the search, by conducting the search in parallel over two or more engines and collating or sharing the resulting information on the fitness of candidate values of the operational variables. The invention is particularly useful where the level of actuation is described not by a single operational variable, but by a combination of several operational variables, in which case the search is more complex and potentially more time consuming. The central control of such a process avoids the need for all engines to evaluate candidate solutions found to be unfavourable by another engine.

In order to converge quickly on an initial sub-range of values for the operational variables which are likely to prove advantageous, it has been found beneficial to apply some assumptions (although at least some of these assumptions may be over-ridden during a secondary search or optimisation routine):

- the concurrent ambient conditions experienced by all engines on the aircraft are substantially the same (e.g. air temperature, pressure, humidity, velocity)
- all engines are operating at substantially the same operating point, with substantially the same combustor technology/characteristics
- all engines exhibit substantially the same levels of efficiency The above assumptions imply that a common control action will have substantially the same impact on contrail suppression or contrail property modification, irrespective of which of the engines it is applied to.

When searching in parallel across a number of engines, the population size and number of parameters to be accounted for will determine the features of the best search algorithm to use. There are already many well-established population-based search algorithms and methodologies (such as genetic algorithms, ant-colony methods, particle swarm optimisation, amongst others), some of which may prove appropriate to this problem. Alternatively a simple bespoke algorithm optimised for small populations could be employed. It will be appreciated that the currently-conventional two or four engine aircraft configuration results in a relatively small population across which the search is performed.

An additional advantage of population-based search is that it makes the overall search more robust in a search space which may consist of multiple optima. That is to say, a population based search increases the likelihood that the search will not select a local optimum, but will instead be able to determine the global optimum across the entire searched range. This has particular value when the search space is multi-dimensional, i.e. where a plurality of contrail mitigating operational variables are available.

The search is performed to identify a value or range for one or more operational variable that reduces or maintains a level of a contrail characteristic, at or below a threshold level. A pre-determined, static threshold value may be used or else a dynamic value, for example that may vary in response to engine operating point, and/or ambient conditions. A zero contrail (or persistent contrail) threshold could be used. A threshold may be defined in terms of the optical depth (OD) determined by one or more sensors 20. The search may be performed to identify an optimal reduction of a contrail characteristic under the available range of operational variable values. The controller may determine whether the optimal value is desirable once found.

There are various possible search strategies employing the present invention. Searches may be initiated either at pre-determined time intervals and/or in response to changes in operating conditions as discussed above. For example, searches may initiated periodically, every minute or a plurality of minutes (such as 5 minutes or anywhere between 2-10 minutes), unless a change in operating conditions instigates a search in the interim. In one embodiment, it is possible that searches could be instructed continuously, particularly in regions of ice supersaturated air.

In a simple embodiment, the above assumptions may be used to instruct a search in parallel across all engines in order to find a value of one or more operational variable that achieves the threshold level for contrail formation. That value of the one or more operational variable is then implemented by the controller across all engines on the aircraft.

Alternatively, it would be possible to instruct a search using only one engine or a subset of total number of engines, whilst maintaining the others at the current optimum until something better is found. This has the advantage that it reduces the risk of poor-quality candidate solutions being applied simultaneously to all engines during the search phase, e.g. reducing the number of evaluations of disadvantageous operational variable settings.

The above simple search examples concern an idealised scenario in which all engines installed on an aircraft can be viewed as being identical in terms of combustion characteristics and efficiency levels. Generally this will not be the case since engines may be of different ages and/or may experience performance degradation, in-service events and/or maintenance actions independently of each other. In the general case, each engine will sit at a particular point on its performance degradation curve and will thus differ slightly from the other engines on the same aircraft.

This will result in a "stochastic" fitness function, in which a different assessment or evaluation of the quality of the candidate solution can result depending upon which engine was used to perform the assessment.

However the extent of differences between engines of the same type on the same aircraft will generally be relatively small (otherwise corrective maintenance/repair action would be taken to reduce the difference). Consequently a maximum range of operational difference between the engines can be assumed or set and accounted for in the search strategy by implementing search in two phases. A first search phase is a coordinated/parallel search involving all the engines, whereby the search results are shared with the controller to quickly find a solution S which, for at least one of the engines, corresponds to an acceptable solution. This first search phase is followed by a local, independent search conducted on each of the engines to explore the locality of S and identify any engine-specific improvements that may be available. The search range of the second, fine search may thus be limited to a sub-range about S, which could be determined from the predetermined maximum range of operational difference between the engines.

Figure 4:
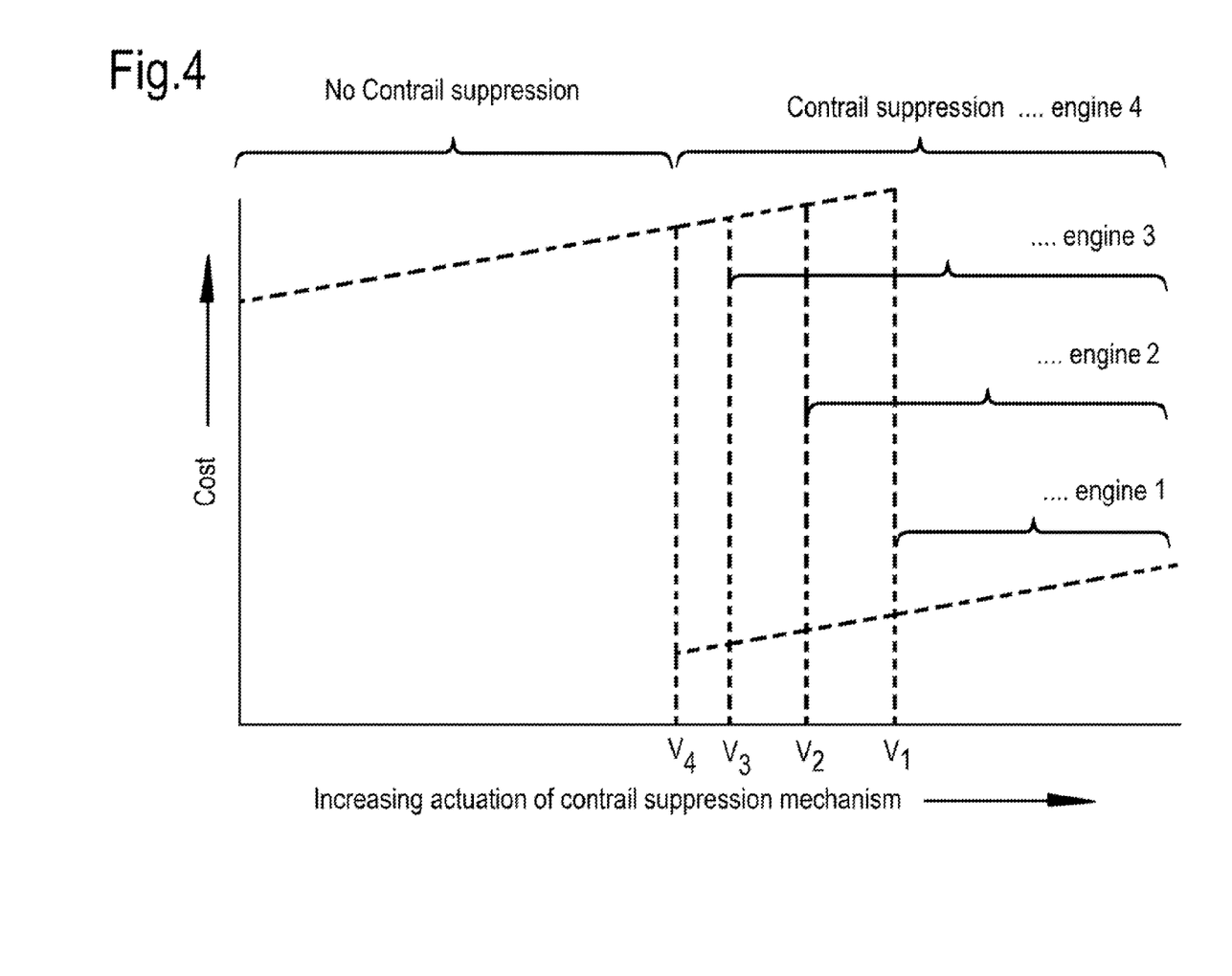
FIG. 4 shows a schematic plot of an engine fitness function for each of a plurality of engines against an operational variable for a contrail suppression mechanism.

By way of example, consider attempted contrail suppression on a four-engined aircraft whose engines are characterised by efficiencies $\eta_1$, $\eta_2$, $\eta_3$ and $\eta_4$, listed in decreasing order of efficiency. The engines display different susceptibilities to contrail formation since their efficiencies are different, a higher efficiency corresponding to contrail formation being possible over a wider range of ambient conditions. There are several cases to consider for such a scenario, the simplest of which is where the contrail suppression control system controls only one operational variable. In such an example, the search space for each engine is one-dimensional, i.e. to achieve acceptable contrail suppression at minimal cost.

Turning to FIG. 4, there is a schematic representation of this scenario, in which the operational cost/penalty of contrail suppression is plotted against the degree of actuation of the contrail suppression mechanism for each engine. In this scenario we wish to find for each engine a value $V_i$ of the control variable which corresponds to the lowest operational cost/penalty. The chart of FIG. 4 represents a simplistic cost function in order to demonstrate the principle and it is possible that different levels of complexity in calculation of cost could be factored into the calculation. The underlying form of the fitness function is one of monotonically increasing cost as the level of actuation of the contrail-suppression mechanism is increased. However, superimposed upon that underlying form is a penalty associated with a failure to suppress contrail formation. This results in a minimum value for the cost function at a level of actuation corresponding to a value $V_i$ which lies at the boundary between the contrail-formation condition and the contrail suppression condition for a particular engine.

A quick initial, i.e. population-based, search strategy of the kind described above is likely to return as its "best solution found" something lying in the region above $V_4$ but not materially above $V_1$. If the population-based search is allowed to continue/iterate then values below $V_1$ would gradually be filtered out as the search discovered that those values were good only for some engines and not for others. This could result in a generally acceptable, but not optimal, solution. One approach to improve the solution found by a population-based search strategy is to configure the controller to track for each engine the best solution found so far for that engine. Thus if a solution (e.g. $V_3$ or $V_4$) is found to be most advantageous for one or more engine but subsequently superseded since it is not suitable for one or more other engine (i.e. engine 1 or engine 2), the controller could still log and instruct that solution for the relevant engines. This route would improve the solution found by the population-based (i.e. parallel) search strategy in a number of scenarios.

Additionally or alternatively, in the general case where it is assumed that following a quick population-based search there will result a collection of values V of the operational variable (which may or not be identical), one for each engine, which have been found to provide adequate contrail suppression for the available range of actuation of the contrail suppression mechanism. A local search is then conducted for each engine separately in order to find the optimal value for each individual engine. The separate local searches can be conducted in parallel (i.e. concurrently) but the results of each local search need not influence the other local searches (i.e. in a non-population based manner). Those engines for which the current best solution lies at a value above $V_i$ will gradually reduce their respective level of contrail-suppression actuation so as to more closely approach the minimum-cost contrail suppression condition. Conversely, those engines whose current best solution lies below $V_i$ will, if using a suitable optimisation algorithm, discover that slightly higher levels of actuation enable them to move from the contrail-formation condition to the contrail-suppression condition.

One difference between the first and second search phases described above is that the second, local search is performed in a region of the search space that is closer to the optimum, and so, for those engines in which the local search starts within the contrail-suppression condition, the local search is performed entirely within a region of low environmental impact. Thus, the range or scope of the second search is narrower than the first, i.e. a sub-range of the first search.

It is also important to note that the two distinct search phases are performed in sequence (i.e. in series). In this manner, a controller can search collaboratively using some or all engines in an initial search phase which quickly identifies the sub-region of the search space in which the optimum points lie. Then each engine, independently of the others, is controlled in conducting its own local search to find its own optimum position. The starting point for each engine's local search is obtained from the results of the first search phase. This approach hinges on the fact that the engines, whilst not identical, are highly similar, and so the points $V_1$, $V_2$, $V_3$ and $V_4$ will in general lie close to each other. The scope of the second search (i.e. the range to be explored about an initial optimum value) may be defined by results from the first search or else applied using a predetermined range based on a known maximum engine performance difference.

In more complicated scenarios the contrail mitigation control system may control two or more control variables. Such a situation might arise for instance in the example of FIGS. 1 and 2, in which a number of fuel compositions are available for blending and optimal relative proportions of each of the distinct fuel compositions are sought to achieve contrail mitigation in the most cost-effective manner. The greater the number of variables, the higher the dimensionality of the search space and the greater the utility of any technique that can reduce the time taken to search that space.

Figure 5:
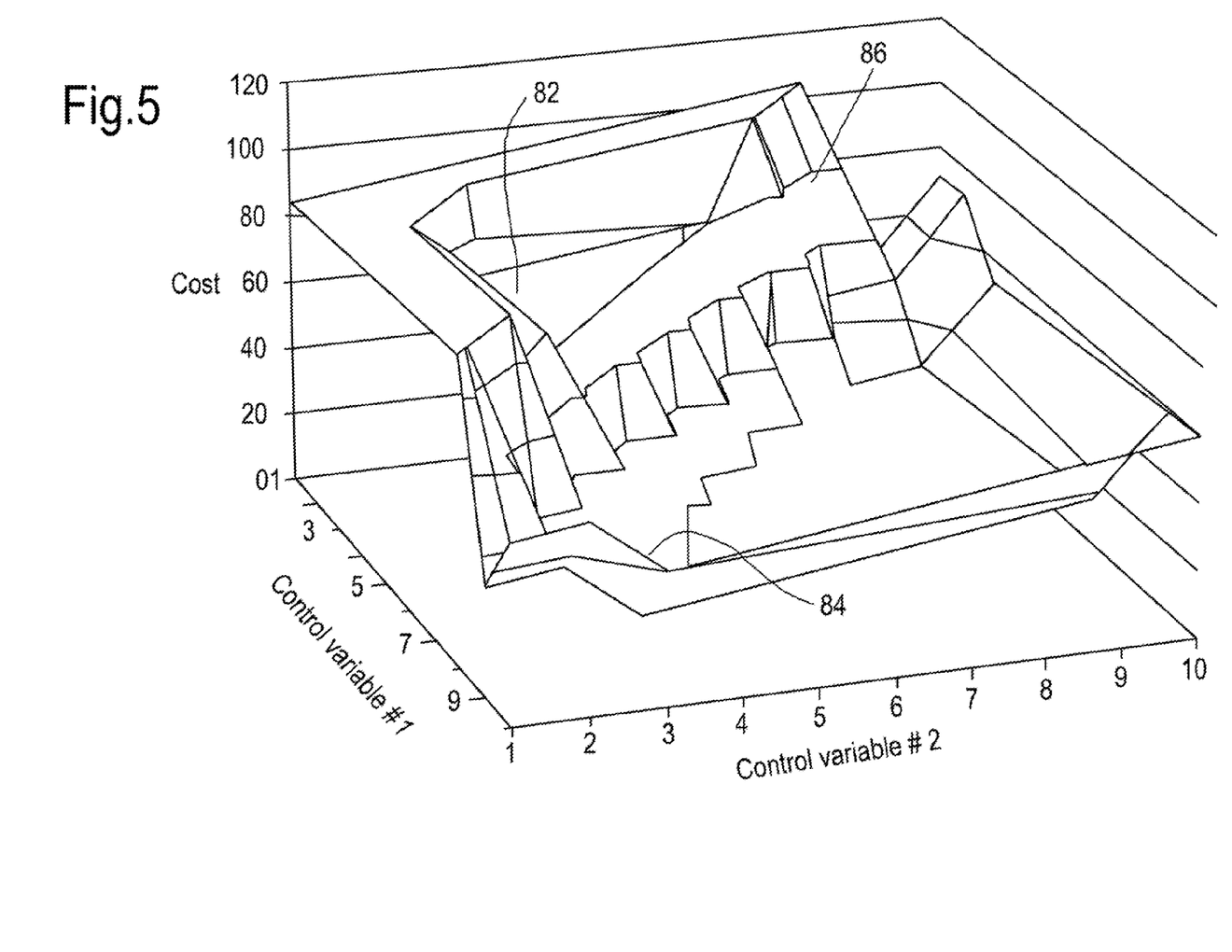
FIG. 5 shows a schematic plot of a hypothetical engine fitness function for a single engine against two operational variables

FIG. 5 shows a schematic plot of a hypothetical cost function (for a single engine) for which the contrail control system controls two control variables. It illustrates the notion of the search space being defined as a surface 86. The search space may have one or more local optimum 82, which is to be avoided, and the global optimum 84, which is sought by the search algorithm. The global optimum 84 corresponds to the position V, which in this case is a vector of two values (i.e. one for each control variable). One of these surfaces 86 may be defined for each engine, although the surfaces will typically be similar.

As described above a two-stage search process may be used, the first of which is population based and involves pooling of information between engines to quickly find values lying in the region containing the global optimum 84. This is then followed by a second search phase in which each engine explores independently the limited/local region of its own cost function surface to find the engine-specific optimum.

In another example of the invention, the step change in cost shown in FIG. 4 may not exist. For example it may be preferable, using one or more contrail mitigation technique, to alter the properties of a contrail rather than avoid its formation entirely. Thus the step change that occurs upon contrail elimination would no longer be present and the variation of the cost function with small changes in the position within the search space is likely to be less significant. This makes the proposed population-based search even more effective since the cost differences for different engines resulting from the initial search phase are likely to be less pronounced. The technique may thus be used for single or multiple control variables in the manner described above but with potentially less focus on the second phase of the search. The second phase of the search thus may or may not be required.

Figure 6:
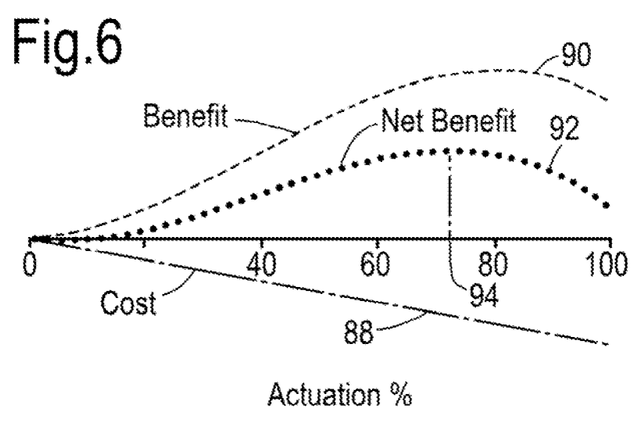
FIG. 6 shows a schematic plot for a single engine of a hypothetical net-benefit function against the degree of actuation of a contrail mitigation mechanism according to an example of the invention.

In any of the above-described examples, the cost function is defined with respect to a number of independent variables or "levers" which can be altered in an attempt either to influence contrail properties or to suppress contrail formation.

Where the above examples use information-sharing between multiple engines primarily to increase the speed with which a low-environmental-impact solution for each engine is discovered, it is proposed that parallel-searching and/or information-sharing between engines according to the invention can also be used to identify opportunities for reducing the operational cost of contrail modification. As an illustration, FIG. 6 shows hypothetical cost 88, benefit 90 and net-benefit 92 curves for a single engine, as a function of the degree/percentage of actuation of a contrail mitigation technique. The net benefit is thus a summation of the negative cost and positive benefit values. The positive benefit values arise from the reduced climate-change impact of the contrail. The optimum level of actuation 94, given the shape of the net benefit curve applying at the current operating conditions, is also shown. In contrast with the idealised cost function shown in FIG. 4, this net-benefit function is non-linear (as will generally be true in practice). In this particular case, the non-linearity is such that the marginal benefit of contrail property modification becomes progressively more favourable as the level of actuation increases up to a peak value 94.

However the actuation of a contrail modification mechanism generally requires some form of energy or material input, corresponding to the degree of actuation, which may limit the achievable level of actuation. Additionally or alternatively operational conditions may limit the lower and/or upper limit of possible contrail mechanism actuation. Thus it may be that the optimum level shown in FIG. 6 cannot be achieved for all engines. A constrained actuation situation such as this might arise, for example, during long-range flights or during manoeuvres, in which the amount of available resources (materials or energy) are limited.

Figure 7:
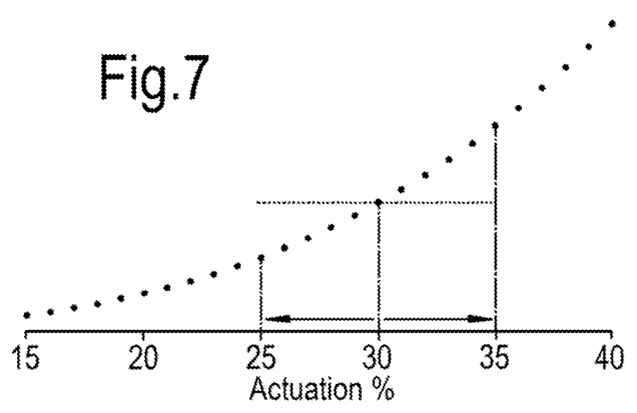
FIG. 7 shows a schematic plot for a single engine of a net-benefit function against the degree of actuation of a contrail mitigation mechanism for a limited range of operation of the contrail mitigation mechanism; and, FIG. 8 shows a schematic plot of an alternative net benefit function for a single engine.

FIG. 7 illustrates a constrained portion of a non-linear net benefit function. In this example, the limit on the total actuation of a contrail-mitigation mechanism is such that, if contrail modification were to be actuated to the same extent for all engines, the maximum achievable common actuation value would be, for example, 30%. However, due to the non-linearity of the net benefit curve for each engine, in this example the combined net benefit across all the engines (i.e. the net benefit at the aircraft level) can be improved by reducing the level of actuation of one or more (e.g. half) of the engines below the maximum common actuation value (e.g. to 25%), whilst increasing the level of actuation of one or more remaining (e.g. half) engine (e.g. to 35%). This is because the rate of increase or gradient to one side of the common actuation point is greater than the rate of increase or gradient to the other side. Thus the contrail actuation point of different engines may be set at an equal but opposite difference from a common actuation point. In this way the total energy requirement is the same, but the net benefit realised at the aircraft level is increased by using a shared or population-based approach rather than a single or averaged-engine approach.

In this example of control optimisation, the fitness function used by the search algorithm may apply the (arithmetic) sum of the net-benefit curves of all the engines. The exact form of the net-benefit curve for an engine will depend on a number of engine properties and ambient conditions, such that its shape will typically be rather more complicated than the hypothetical examples of FIG. 6 and FIG. 7, thus making the use of a search algorithm highly appropriate.

Figure 8:
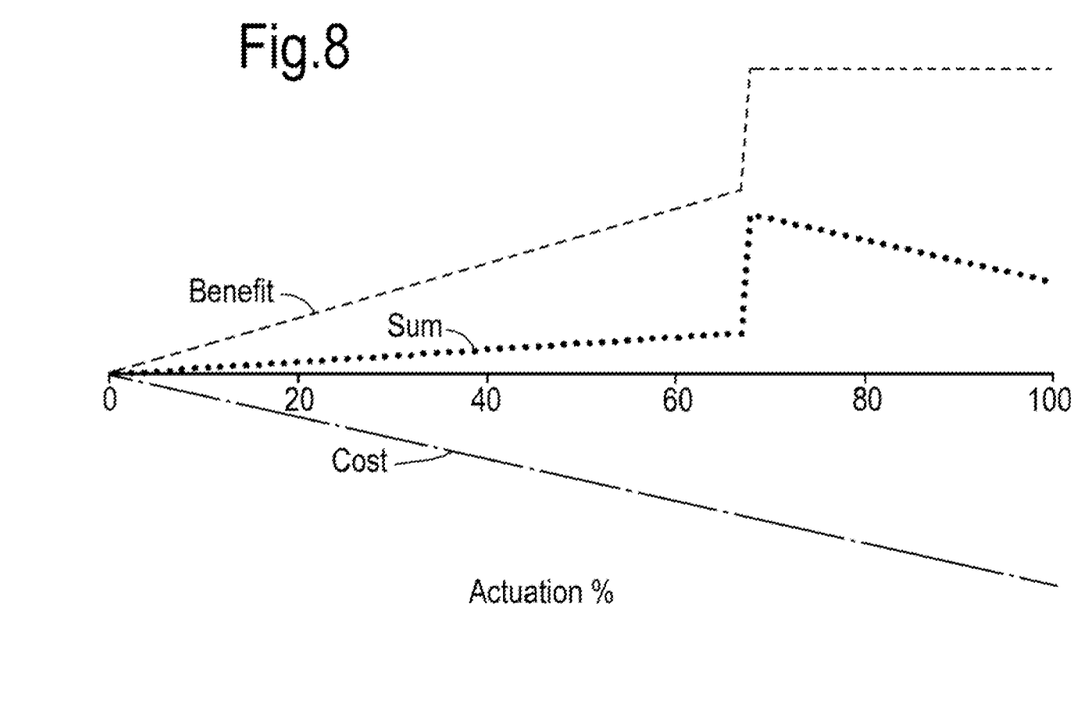

FIG. 8 shows another example of a net benefit chart intended to represent a situation in which low levels of actuation result in a steadily increasing level of benefit arising from contrail property modification (e.g. optical depth reduction), followed by a sudden increase in benefit as contrail suppression is achieved. In a constrained actuation scenario, it may not be possible to achieve contrail suppression on all engines simultaneously. However, by reducing the level of activation on some engines and increasing it on others, it may be possible to achieve contrail suppression on the latter group, thereby improving the net benefit at the aircraft level beyond what would have been possible if the contrail mechanism actuation level for each engine had been set to the same level. Thus the parallel search system of the invention allows sharing of an available contrail mitigation energy budget unevenly between the engines.

Although with present-day aircraft types the population size (i.e. number of engines installed on the aircraft) would be relatively small (generally 4 or less), should future aircraft designs specify larger numbers of smaller engines then the present invention's effectiveness versus the prior art would be improved further due to the resulting increase in population size.

The present invention is particularly beneficial since there will typically be a time delay between instructing a particular level of actuation of a contrail mitigation mechanism and the resulting change in one or more corresponding contrail property. Thus the invention provides a way of managing and minimising the time required to arrive at a suitable or optimal contrail mitigation setting.

The invention claimed is:

1. An aircraft propulsion system control method comprising:
receiving a sensor reading indicative of actual or implied vapour trail formation by one or more of a plurality of engines on the aircraft;
controlling operation of one or more operational variable for each of the plurality of engines to undertake a search of trial values of said operational variable by instructing different concurrent values of said operational variable for the plurality of engines and determining the resulting impact on the vapour trail formation by monitoring the corresponding sensor reading;
wherein, the operational variable is an engine-specific control variable for which a desired setting is to be determined; and
implementing one of the trial values of the operational variable from the search for one or more engine.

2. An aircraft propulsion control system method according to claim 1, wherein a controller controls a plurality of operational variables for contrail mitigation and undertakes a multi-dimensional search for an optimal value of each operational variable.

3. An aircraft propulsion control system method according to claim 1, wherein a controller instructs trial values of the one or more operational variable for one or more engine whilst retaining a predetermined value of the one or more operational variable on one or more further engine.

4. An aircraft propulsion control system method according to claim 1, wherein the search by a controller comprises sweeping through a range of trial values of the one or more operational variable.

5. An aircraft propulsion control system method according to claim 4, wherein different portions of the swept range are assigned to different engines by the controller.

6. An aircraft propulsion control system method according to claim 1, wherein the search is performed over a predetermined range of values of the one or more operational variable and a trial value or sub-range found to meet a predetermined contrail mitigation threshold on one engine during the search is implemented by the controller on all of the plurality of engines.

7. An aircraft propulsion control system method according to claim 6, wherein the search is a first search phase and a controller instructs a second search phase on one or more engine based on the trial value or sub-range found to meet the predetermined contrail mitigation threshold, and wherein the second search phase is narrower in scope than the first search phase.

8. An aircraft propulsion control system method according to claim 7, wherein the second search phase is instructed on a plurality or all of the engines independently and/or concurrently by the controller and the controller selects an optimum value of the one or more operational value for each engine individually during the second search phase.

9. An aircraft propulsion control system method according to claim 7, wherein the first search phase is performed to identify a value or sub-range of the one or more operational variable that satisfies one or more primary operational requirement and the second search phase is preformed to identify a value or sub-range of the one or more operational variable that satisfies one or more further operational requirement.

10. An aircraft propulsion control system method according to claim 7, wherein the trial value or sub-range found to meet a predetermined contrail mitigation threshold on one engine is selected by the controller and the controller applies a confidence value to the selected value of the operational variable based upon an operating condition of said one engine.

11. An aircraft propulsion control system method according to claim 1, wherein a controller comprises a model or correlation between the operational variable values of the engine for contrail mitigation and an operational cost associated with said operational variable values, the controller selecting a value of the operational variable found by the search to offer a minimum operational cost.

12. An aircraft propulsion control system method according to claim 11, wherein the controller determines a net operational cost by summation of the operational costs for each of the plurality of engines and the controller selects concurrent values of the operational variable for each engine so as to minimise the net operational cost.

13. An aircraft propulsion control system according to claim 11, wherein the operational cost comprises change in one or more of engine operational efficiency, engine fuel consumption and/or climate impact associated with changes in the operational variable.

14. An aircraft propulsion control system method according to claim 1, wherein the system comprises a contrail mitigation mechanism for each engine and the operational variable comprises a setting for the contrail mitigation mechanism.

15. An aircraft propulsion control system method according to claim 1, wherein the search by a controller is initiated by a change in one or more sensor reading and/or a predetermined time since a previous search.

16. A data carrier comprising machine readable instructions for control of an aircraft propulsion system controller to perform a method comprising:
receiving a sensor reading indicative of actual or implied vapour trail formation by one or more of a plurality of engines on the aircraft;
controlling operation of one or more operational variable for each of the plurality of engines to undertake a search of trial values of said operational variable by instructing different concurrent values of said operational variable for the plurality of engines and determining the resulting impact on the vapour trail formation by monitoring the corresponding sensor reading;
wherein, the operational variable is an engine-specific control variable for which a desired setting is to be determined; and
implementing one of the trial values of the operational variable from the search for one or more engine.

17. A controller for an aircraft propulsion system comprising the data carrier of claim 16.

18. An aircraft propulsion control system for an aircraft comprising a plurality of combustion engines, the system comprising:
one or more sensor for sensing a condition indicative of actual or implied vapour trail formation by one or more of the plurality of engines;
a controller arranged to control one or more operational variable for each of the plurality of engines, wherein the controller is arranged to undertake a search of trial values of said operational variable by instructing different concurrent values of said operational variable for the plurality of engines and determining the resulting 15 impact on the vapour trail formation by the one or more sensor; and
wherein, the operational variable is an engine-specific control variable for which a desired setting is to be determined.

19. An aircraft propulsion control system according to claim 18, wherein the controller identifies and implements the trial value providing the optimal vapour trail mitigation effect.

20. An aircraft propulsion control system according to claim 18, wherein the controller comprises a model or correlation between the operational variable values of the engine for contrail mitigation and an operational cost associated with said operational variable values, the controller selecting a value of the operational variable found by the search to offer a minimum operational cost.

21. An aircraft propulsion control system according to claim 18, wherein the system comprises a contrail mitigation mechanism for each engine and the operational variable comprises a setting for the contrail mitigation mechanism.

22. An aircraft propulsion control system according to claim 18, wherein the sensor comprises one or more vapour trail characteristic detection sensors, such as an optical depth sensor.

* * * * *